Patented Aug. 13, 1935

2,011,292

UNITED STATES PATENT OFFICE 2,011,292

PREPARATIONS CONTAINING ALUMINIUM ACETATE AND ALUMINIUM FORMATE

Ernst Koch, Frankfort-on-the-Main, Germany, assignor to General Aniline Works, Inc., New York, N. Y., a corporation of Delaware No Drawing. Application September 11, 1934, Serial No. 743,619. In Germany September 16, 1933

10 Claims. (Cl. 23—250)

I have found that stable solutions of aluminium acetate or aluminium formate may be obtained by adding to solutions of neutral or basic aluminium acetate or formate of the following general formula:

wherein $X_1$ stands for —OOCH or —OOC.CH$_3$ and $X_2$ and $X_3$ stand for —OH or —OOCH or —OOC.CH$_3$, urea or thiourea or derivatives thereof, such as N-alkyl or aliphatic N-acyl derivatives of urea and thiourea, for instance, methyl-, ethyl-, propyl-, symmetrical and asymmetrical dimethyl-, diethyl- and dipropyl-urea and -thiourea, formyl-, acetyl-, diacetyl-, chloroacetyl-, methylacetyl-, oxalyl-, malonyl-urea, acetyl thiourea etc. and salts of urea with aliphatic dicarboxylic acids, such as salts of urea with oxalic acid, malonic acid, succinic acid, fumaric acid, maleic acid, malic acid, tartaric acid, citric acid, or mixtures of these substances.

The quantity of the adjuvants depends on the concentration of the solution. In the case of a solution of an aluminium salt of specific gravity 1.09 there must be added, for instance, about 5–15 grams of the adjuvant per kilogram.

The solutions thus obtained are stable in the different merchantable concentrations for an unlimited time. They may be evaporated to dryness without decomposition of the aluminium salts so that solid water soluble aluminium acetate or formate may be obtained. The solid salts dissolve entirely in water even after a long storage without any decomposition of the aluminium salts.

The solutions of these products may be used with special advantage in the textile industry because they do not contain any substances which would have a detrimental effect when used, for instance, for impregnation purposes.

The following examples serve to illustrate the invention but they are not intended to limit it thereto, the parts being by weight unless otherwise stated:

1. In 1000 parts of a solution of aluminium formate of specific gravity 1.09 there are dissolved 8 parts, i. e. 0.8 per cent, of urea. The solution thus obtained is stable for an unlimited time. If the solution is evaporated to dryness a white powder is obtained which contains about 8 per cent of urea. The dry aluminium formate is water-soluble even after a long storage.

2. To a solution of 1000 parts of aluminium acetate of specific gravity 1.05 there are added 12 parts, i. e. 1.2 per cent, of thiourea. If the solution which may be stored for an unlimited time is evaporated in a vacuum there is obtained after drying a white non-hygroscopic salt which contains about 12 per cent of thiourea and dissolves in water even after a long storage without any residue.

3. In a solution of 1000 parts of aluminium acetate of specific gravity 1.062 there are dissolved 12 parts, i. e. 1.2 per cent, of urea oxalate. From the solution thus obtained there separates no water-insoluble basic aluminium acetate even after a long storage. This would, however, be the case if urea oxalate had not been added. When the solution is evaporated to dryness a white powder is obtained which contains about 12 per cent of urea oxalate.

4. To a solution of 1000 parts of aluminium formate of specific gravity 1.086 there are added 6 parts of thiourea, i. e. 0.6 per cent, 4 parts of urea, i. e. 0.4 per cent, and 4 parts of formylurea, i. e. 0.4 per cent. If the solution, which may be stored for an unlimited time, is evaporated in a vacuum and dried a stable white salt is obtained which is completely soluble in water.

I claim:

1. An aqueous stable solution of an aluminium salt of the general formula:

wherein $X_1$ stands for —OOCH or —OOC.CH$_3$ and $X_2$ and $X_3$ stand for —OH or —OOCH or —OOC.CH$_3$, containing at least one compound selected from the group consisting of urea, thiourea, N-alkyl and aliphatic N-acyl derivatives of these compounds, and salts of urea with aliphatic dicarboxylic acids in which solutions the aluminium salts do not decompose and which solutions are capable of being evaporated to dryness to form solid stable preparations dissolving in water without decomposition of the aluminium salts.

2. An aqueous stable solution of aluminium formate containing urea, in which solution the aluminium salt does not decompose and which solution is capable of being evaporated to dryness to form a solid stable preparation dissolving in water without decomposition of the aluminium salt.

3. An aqueous solution of aluminium formate of specific gravity 1.09 containing 0.8 per cent of urea in which solution the aluminium salt does not decompose and which solution is capable of being evaporated to dryness to form a solid stable preparation dissolving in water without decomposition of the aluminium salt.

4. An aqueous solution of aluminium acetate containing thiourea, in which solution the aluminium salt does not decompose and which solution is capable of being evaporated to dryness to form a solid stable preparation dissolving in water without decomposition of the aluminium salt.

5. An aqueous solution of aluminium acetate of specific gravity 1.05 containing 1.2 per cent of thiourea, in which solution the aluminium salt does not decompose and which solution is capable of being evaporated to dryness to form a solid stable preparation dissolving in water without decomposition of the aluminium salt.

6. Solid stable preparations obtainable by evaporating to dryness the solutions of claim 1, dissolving in water without decomposition of the aluminium salts.

7. A solid stable preparation obtainable by evaporating to dryness the solution of claim 2, dissolving in water without decomposition of the aluminium salt.

8. A solid stable preparation obtainable by evaporating to dryness the solution of claim 3, dissolving in water without decomposition of the aluminium salt.

9. A solid stable preparation obtainable by evaporating to dryness the solution of claim 4, dissolving in water without decomposition of the aluminium salt.

10. A solid stable preparation obtainable by evaporating to dryness the solution of claim 5, dissolving in water without decomposition of the aluminium salt.

ERNST KOCH.